(12) United States Patent
Fregonese et al.

(10) Patent No.: US 7,367,619 B2
(45) Date of Patent: May 6, 2008

(54) SADDLE SUPPORT STRUCTURE

(75) Inventors: Massimo Fregonese, Bassano (IT); Branko Lukic, Menlo Park, CA (US); Thomas Overthun, San Francisco, CA (US); Chris Cowart, Boulder, CO (US)

(73) Assignee: Selle Royal SpA, Pozzoleone (Vicenza) (IT)

( * ) Notice: Subject to any disclaimer, the term of this patent is extended or adjusted under 35 U.S.C. 154(b) by 192 days.

(21) Appl. No.: 10/529,177

(22) PCT Filed: Oct. 1, 2003

(86) PCT No.: PCT/IB03/04334
§ 371 (c)(1),
(2), (4) Date: Aug. 15, 2005

(87) PCT Pub. No.: WO2004/031025
PCT Pub. Date: Apr. 15, 2004

(65) Prior Publication Data
US 2006/0022496 A1    Feb. 2, 2006

(30) Foreign Application Priority Data
Oct. 1, 2002   (IT)   .......................... VI2002A0208

(51) Int. Cl.
*B62J 1/00*  (2006.01)
(52) U.S. Cl. .................. 297/195.1; 297/197; 297/202; 297/215.16
(58) Field of Classification Search ............. 297/195.1, 297/202, 214, 215.16, 197
See application file for complete search history.

(56) References Cited

U.S. PATENT DOCUMENTS

| 574,503 | A | 1/1897 | Van Meter |
| 578,837 | A | 3/1897 | Seaman |
| 4,098,537 | A | 7/1978 | Jacobs |
| 5,011,222 | A | 4/1991 | Yates et al. |
| 5,286,082 | A | 2/1994 | Hanson |
| 5,340,192 | A | 8/1994 | Hsh |
| 5,356,198 | A | 10/1994 | Hughes |
| 5,558,396 | A | 9/1996 | Yu |
| 6,131,994 | A | 10/2000 | Yates |
| 6,629,728 | B2 | 10/2003 | Losio et al. |
| 6,739,656 | B2 | 5/2004 | Yu |

FOREIGN PATENT DOCUMENTS

WO        0212055 A1    2/2002

*Primary Examiner*—Peter R. Brown
(74) *Attorney, Agent, or Firm*—Alston & Bird LLP (57) ABSTRACT

A support structure having a seat surface (2), particularly for bicycles and other pedal operated machines, comprises a substantially rigid or semirigid frame (3), means for connecting the frame (3) to the bicycle or a pedal operated machine, a yieldable padding (7) secured to the top face of the frame (3), a covering layer (8) superimposed to the yieldable pad (7), characterized in that the frame (3) has one or more differential rigidity portions (11, 11') adapted to facilitate the pedaling motion. The differential rigidity portions (11, 11') are situated at an outer peripheral edge (13) of the frame (3), along which at least one recess (12) is provided. Each differential rigidity portion (11, 11') comprises a plurality of projections (14) extending outwardly of recesses (12) formed in the frame (3).

19 Claims, 6 Drawing Sheets

SADDLE SUPPORT STRUCTURE

TECHNICAL FIELD

This invention finds application in the field of cycles and similar products and relates to a support structure having a seat surface for users of pedal driven machines or vehicles.

BACKGROUND ART

In the field of pedal driven machines, such as bicycles, tricycles, exercise bicycles or the like, numerous examples of support structures, or saddles, are known, which are adapted to support users on a seat surface.

A saddle generally comprises a rigid structure adapted to support the body weight of the user and allows attachment of the saddle onto a bicycle or similar vehicle by suitable fastening means.

In order to reduce compression at the contact points between the seat surface and the user it is common to use elastic and/or shock absorbing elements, generally made of a polymeric foam or a material having a viscous behavior, interposed between the seat surface and the rigid structure.

During pedaling, the inside thigh areas of the user repeatedly contact the side periphery of the saddle, thereby causing periodic rubbing and consequent local irritations, unless particular arrangements are provided.

A possible solution consists in reducing the extension of the rigid structure or making it partly pliable at the side edges of the saddle, said edges being mainly formed by a soft material, adapted to be elastically deformed during the pedaling activity. This allows to reduce the contact action of the side edges of the saddle on the relevant body areas but leads to other drawbacks.

A first drawback consists in that the presence of such pliable edges reduces the surface in contact with the user's body and, as a result, increases the pressure exerted by the saddle.

A second drawback associated with such pliable side edges is that they cause the rigid structure to be permanently, and often unacceptably weakened.

One solution to reduce or avoid contacts and repeated rubbing against the inside thighs consists in using additional soft pads, placed at the side edges of the saddle.

U.S.-A-20020069464 discloses an additional pad to be fitted to the outside surface of a saddle. Such additional pad consists of two substantially parallel soft tubular members, which are connected by a flexible member made of fabric or similar material. The flexible fabric member has such a size that, once it is laid over the seat surface of the saddle, the two soft tubular members are situated along the side edges of the saddle, in areas at highest contact with the inside thighs of the user.

An apparent limit of this solution lies in that the additional pad, when not properly secured, may be displaced during use, due to the motion of legs, and is in any case a supplement member, which has to be repeatedly checked for proper positioning. Further, the use of an additional member necessarily implies a more complex construction, requires particular care in mounting operations, and greatly changes the aspect of the saddle.

WO-A-0051877, U.S. Pat. No. 6,019,422, GB-A-2184698 disclose several embodiments that may be all associated to the same operation principle. The saddle is of the conventional type, with a rigid structure covered with a soft material, which is designed to improve the comfort of the seat surface. Any possible rubbing against the inside thighs of the user is attenuated by appropriate swingable means for securing the saddle to the frame of the pedal operated machine. Such swingable fastening means allow the saddle to rotate through a limited angle about an axis parallel to the longitudinal axis of the saddle. By this arrangement, during the pedaling action, the saddle may rock on the side of the pushing leg and the pressures exerted on the inside thigh are reduced.

A common drawback of all these embodiments consists in the remarkable complicated structure introduced by the use of these swingable fastening means, and by the consequent increase of construction costs.

WO-A-02/12055 discloses a support structure having all the features mentioned in the preamble of claim 1. However, in this prior art the outer peripheral edge of the frame is substantially continuous and has a relatively rigid rim which reduces the flexibility of the frame itself. Thus, the support structure disclosed in this prior art cannot reduce the compression in the vicinity of the outer edge of the frame so as to render less comfortable the pedalling motion.

DISCLOSURE OF THE INVENTION

A main object of this invention is to obviate the above mentioned drawbacks, by providing a support structure for a bicycle or other pedal driven machine, which is adapted to fit the muscles of legs and buttocks, and to provide high wellness and comfort during use.

A further object of the invention is to provide a support structure which has a sufficiently wide seat surface and such a shape as to limit compression both caused by the user's weight and by the pedaling motion, which are exerted in the inside thigh areas of the user.

A particular object is to provide a support structure which fits users of different statures and sizes.

Another particular object is to provide a support structure which is cost effective and achieve the desired performances without requiring expensive additional elements or excessive by complicated constructions.

Yet another particular object is to provide a support structure which is comfortable and safe even when the user stands on the pedals of the bicycle or the like.

An additional object is to provide a support structure that may be shaped in such a manner as to have a pleasant aspect.

These objects, as well as others that will be more apparent hereinafter, are achieved by a support structure according to claim 1. Thanks to such particular arrangement the support structure may fit the muscles of legs and buttocks and provide a high wellness and comfort, even to users having different body sizes, and without requiring expensive additional elements or excessive by complicated structures.

Preferably, the frame has at least one pair of differential rigidity portions, located at the sides, symmetrically with respect to the longitudinal axis which is defined by an elongated front portion of the frame.

Thanks to this particular configuration, the support structure will have a sufficiently wide seat surface of such a shape as to limit the compressions caused by the users weight and, at the same time, will have a local flexibility to also reduce the compressions and rubbing caused by the pedalling motion, in the inside thigh areas of the user.

Suitably, at least one differential rigidity portion is located on the rear edge of the frame.

Thanks to this particular feature, the support structure is comfortable and safe even when the user stands up on the pedals of the bicycle or the like. Also, the rear edge of the support structure may be shaped in such a manner as to be of a pleasant aspect.

BRIEF DESCRIPTION OF THE DRAWINGS

Further features and advantages of the invention will be more clearly understood from the detailed description of several preferred but non-exclusive embodiments of a support structure according to the invention, which are described by way of non-limiting examples with the aid of the annexed drawing sheets, in which.

DETAILED DESCRIPTION OF A PREFERRED EMBODIMENT

With particular reference to the above mentioned figures, a support structure or saddle according to the invention is shown, overall designated 1, which has a seat surface 2, and is particularly designed for bicycles or other pedal driven machines, e.g. exercise bicycles and tricycles.

The support structure 1 comprises a substantially rigid or semi-rigid frame 3, which is made of plastic or composite materials. For example, the frame 3 may be made by molding or injection molding of plastic materials such as PA6, PA12, PBT, PET, PVC, or the like, with different types of fillers. Frame 3 may be secured to a bicycle or a pedal driven machine by appropriate connection means 4, which are known per se and are placed on the bottom side 5 of the frame 3.

A yieldable pad 7 is secured to the top face 6 of the frame 3, to make the seat surface 2 soft and comfortable. The yieldable pad 7 may be made of a material having a substantially elastic behavior, such as a polymer foam, and/or of a material having a substantially viscoplastic behavior, e.g. a gel, or of a combination thereof.

A covering layer 8 is superposed to the yieldable pad 7, to protect the support structure 1 and give it a pleasant aspect. This covering layer 8 may be made of several different materials, such as leather, imitation leather and other synthetic materials, and may have a variety of colors.

Frame 3 has a laterally widened rear portion 9 for supporting the buttocks of a user and an elongated front portion 10 that defines a longitudinal axis L.

According to the invention, frame 3 has one or more portions 11, 11' of different rigidity. Thus it is possible to render more comfortable the pedaling motion, by acting directly on the most rigid component of the support structure 1, without requiring any additional element which would complicate the product and the manufacture thereof.

Suitably, the frame 3 has at least one recess 12, which is formed along an outer peripheral edge 13 of the frame. Each differential rigidity portion 11, 11' is located in the proximity of the outer peripheral edge 13, in correspondence of a respective recess 12.

Advantageously, each differential rigidity portion has a plurality of projections 14 which extend outwardly from their respective recesses 12, and are substantially parallel, so as to form a comblike structure. Such projections 14 may be monolithic with frame 3. Particularly, each projections 14 belonging to a differential rigidity portion 11, 11' is located at a predetermined distance H from the other perspectives adjacent thereto, which distance may vary for each projection 14, depending on the position thereof.

Figure 1:
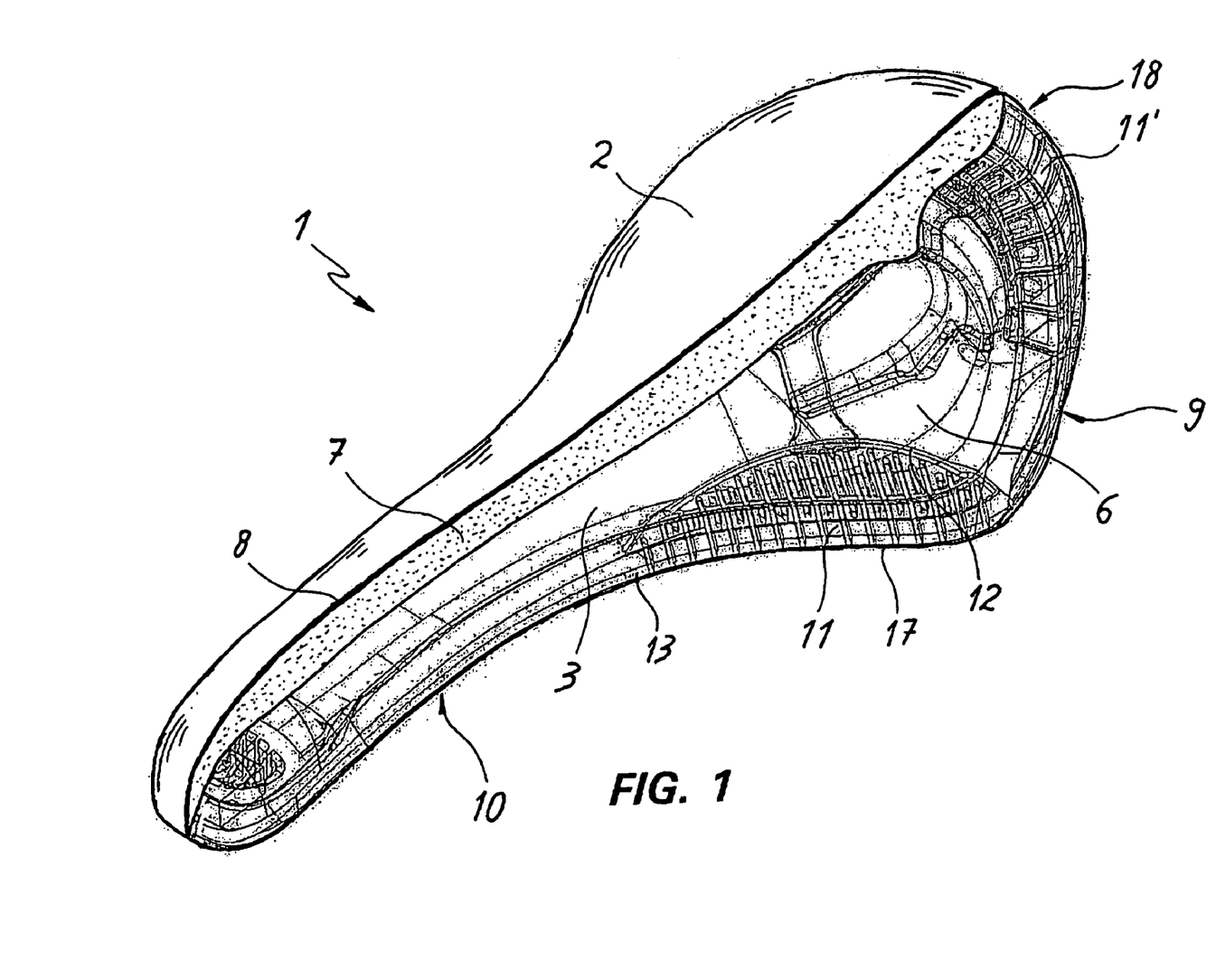
FIG. 1 is a general partly sectioned perspective view of a support structure according to the invention.
Figure 2:
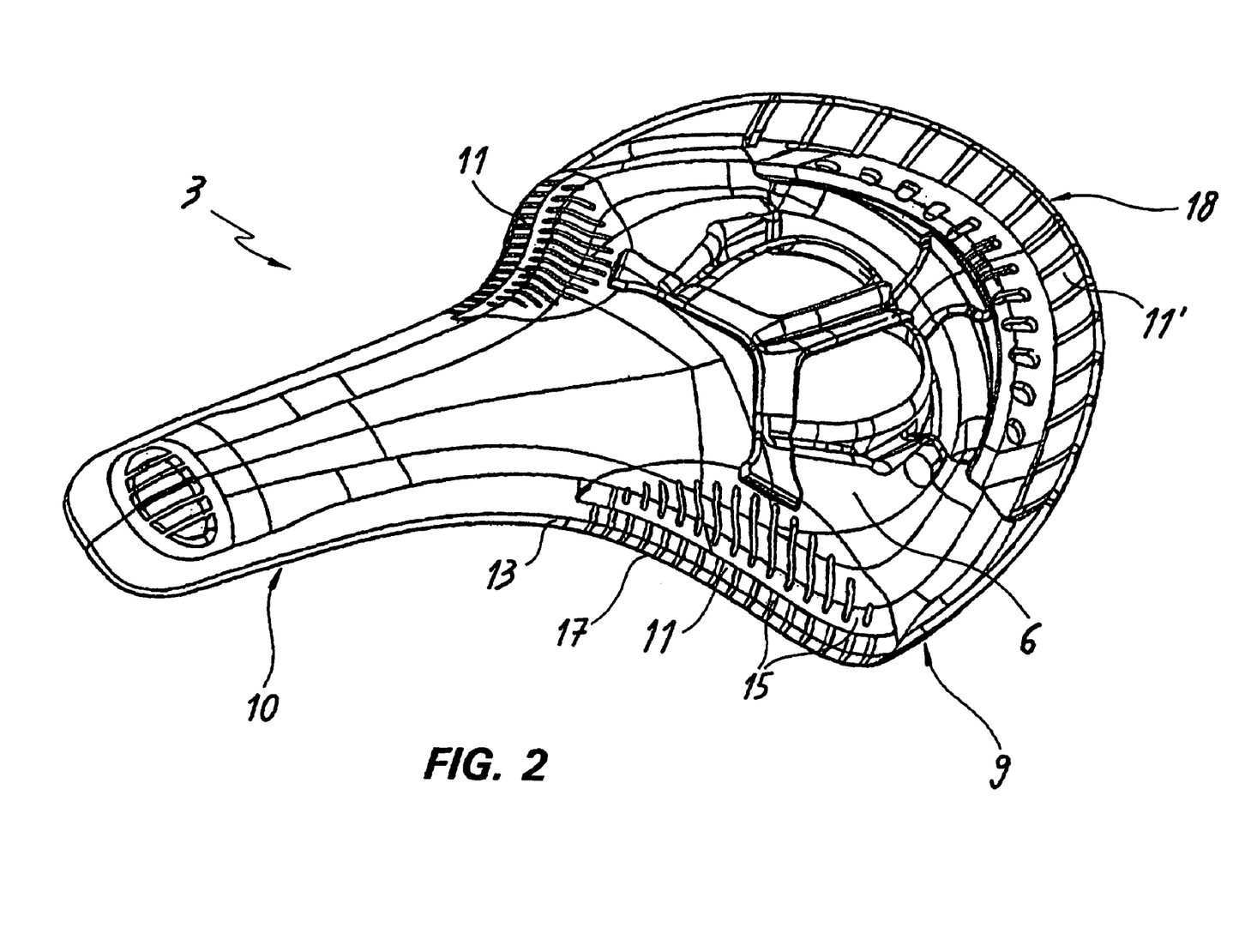
FIG. 2 is a top perspective view of a first embodiment of a part of the support structure shown in FIG. 1.
Figure 3:
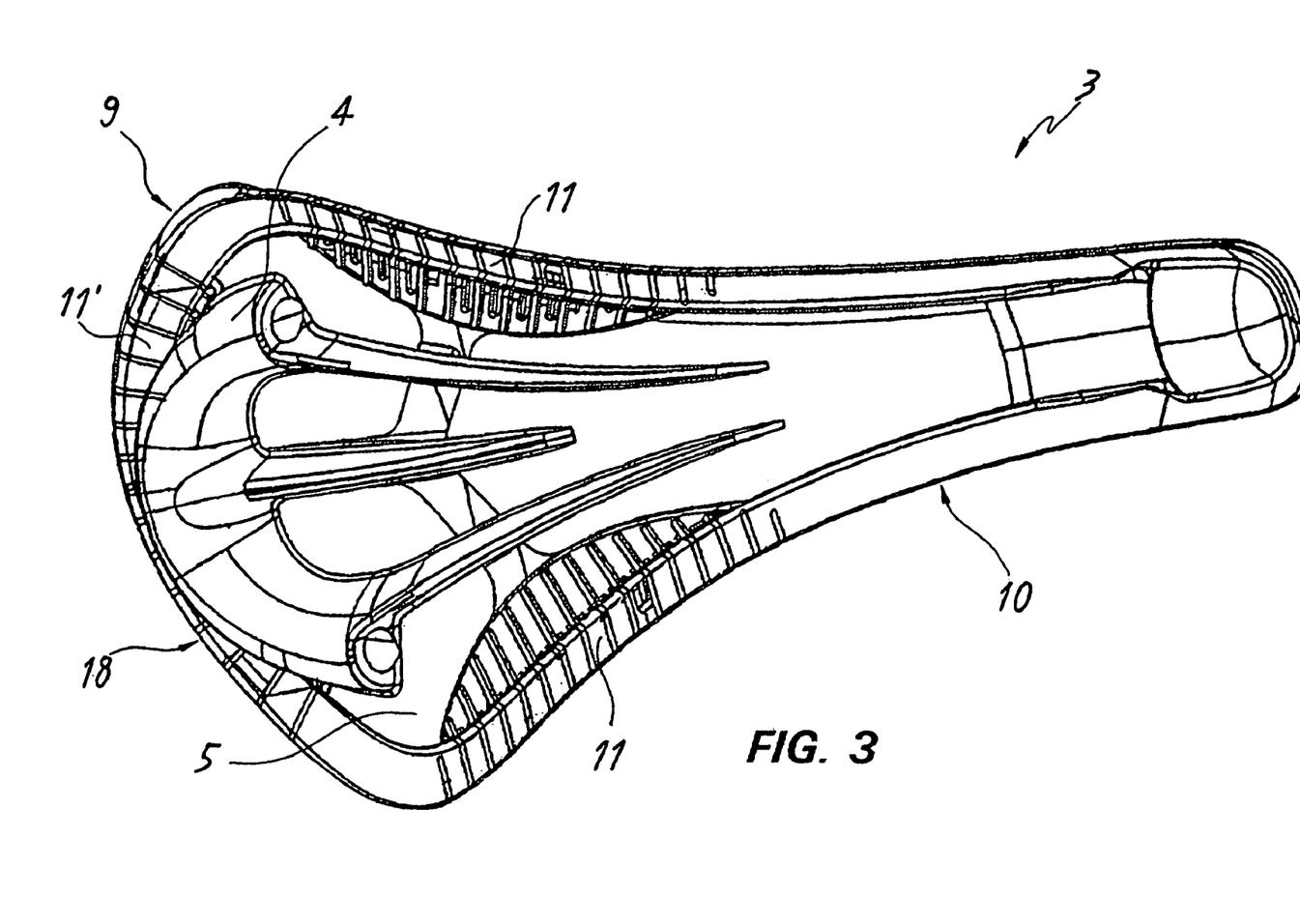
FIG. 3 is a bottom perspective view of the part shown in FIG. 2.
Figure 4:
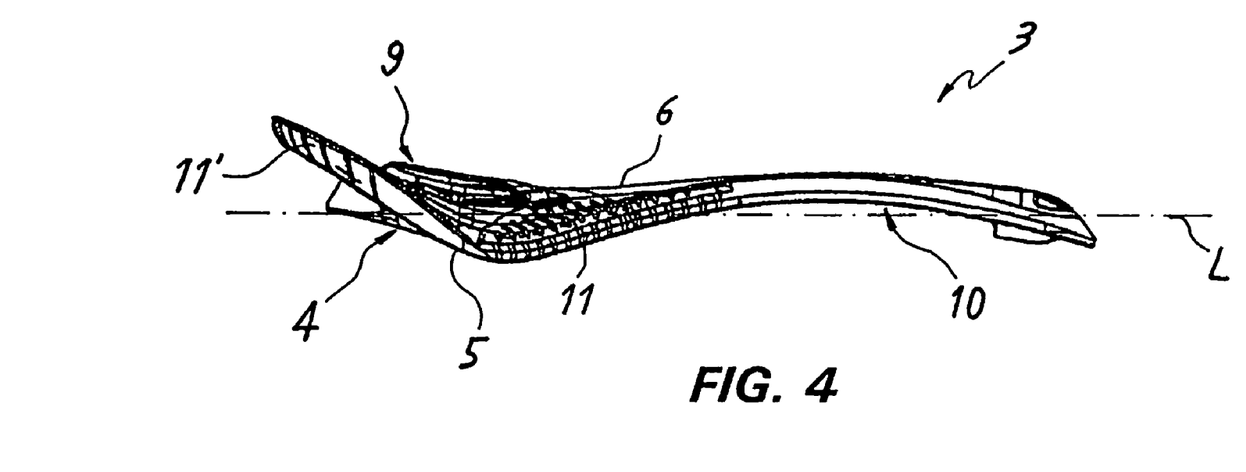
FIG. 4 is a side elevation view of the part of the structure shown in FIG. 2.
Figure 5:
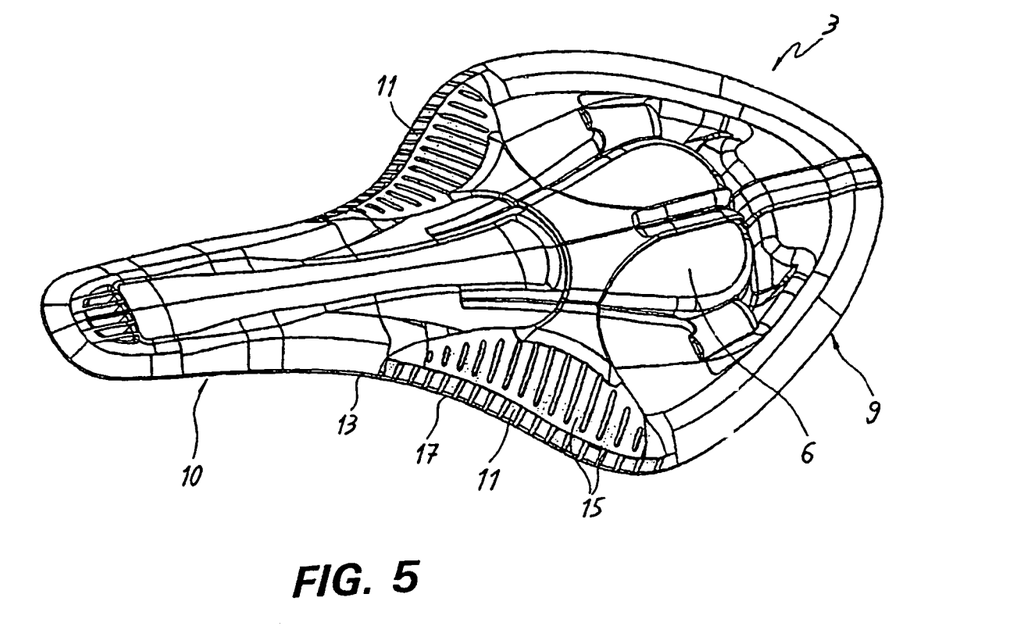
FIG. 5 is a top perspective view of a second embodiment of a part of the support structure according to the invention.
Figure 6:
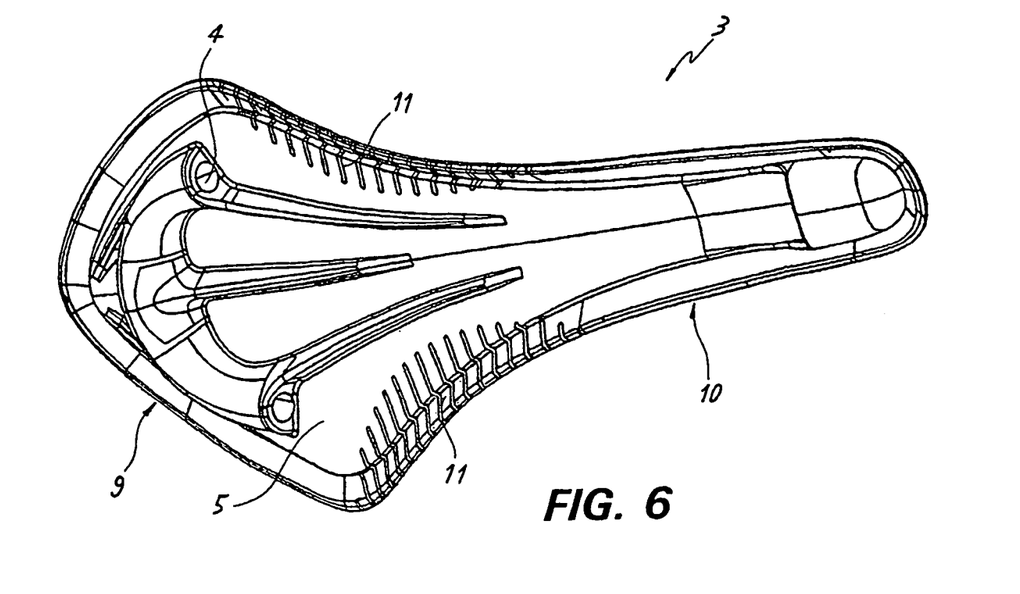
FIG. 6 is a bottom perspective view of the part shown in FIG. 5.
Figure 7:
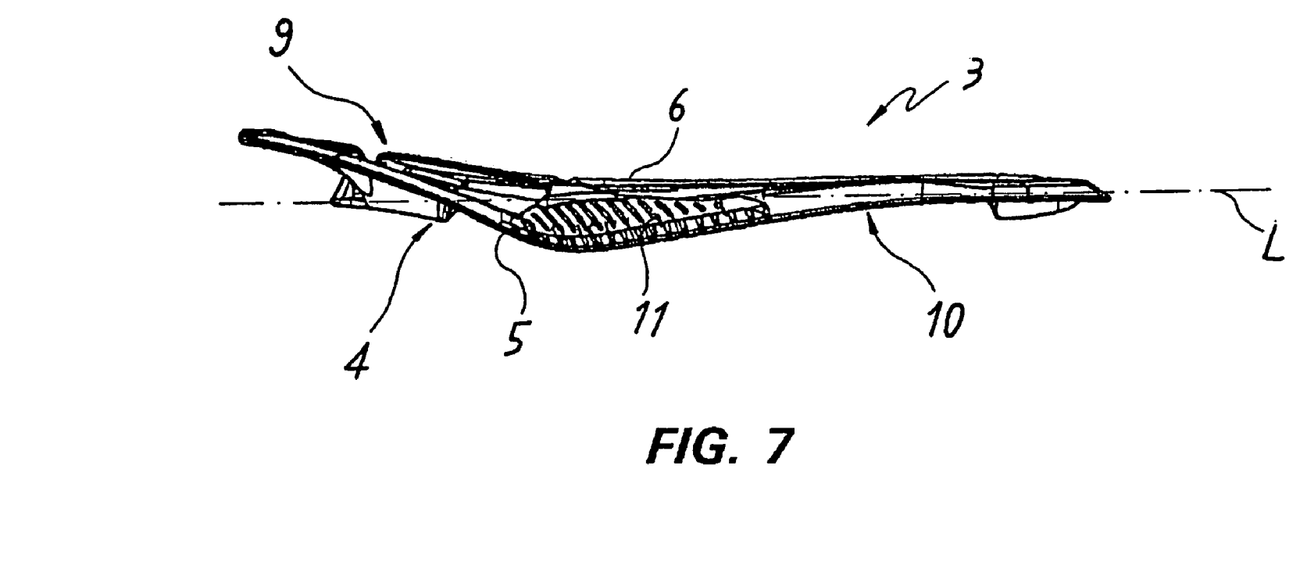
FIG. 7 is a side elevation view of the part of the structure shown in FIG. 5.
Figure 8:
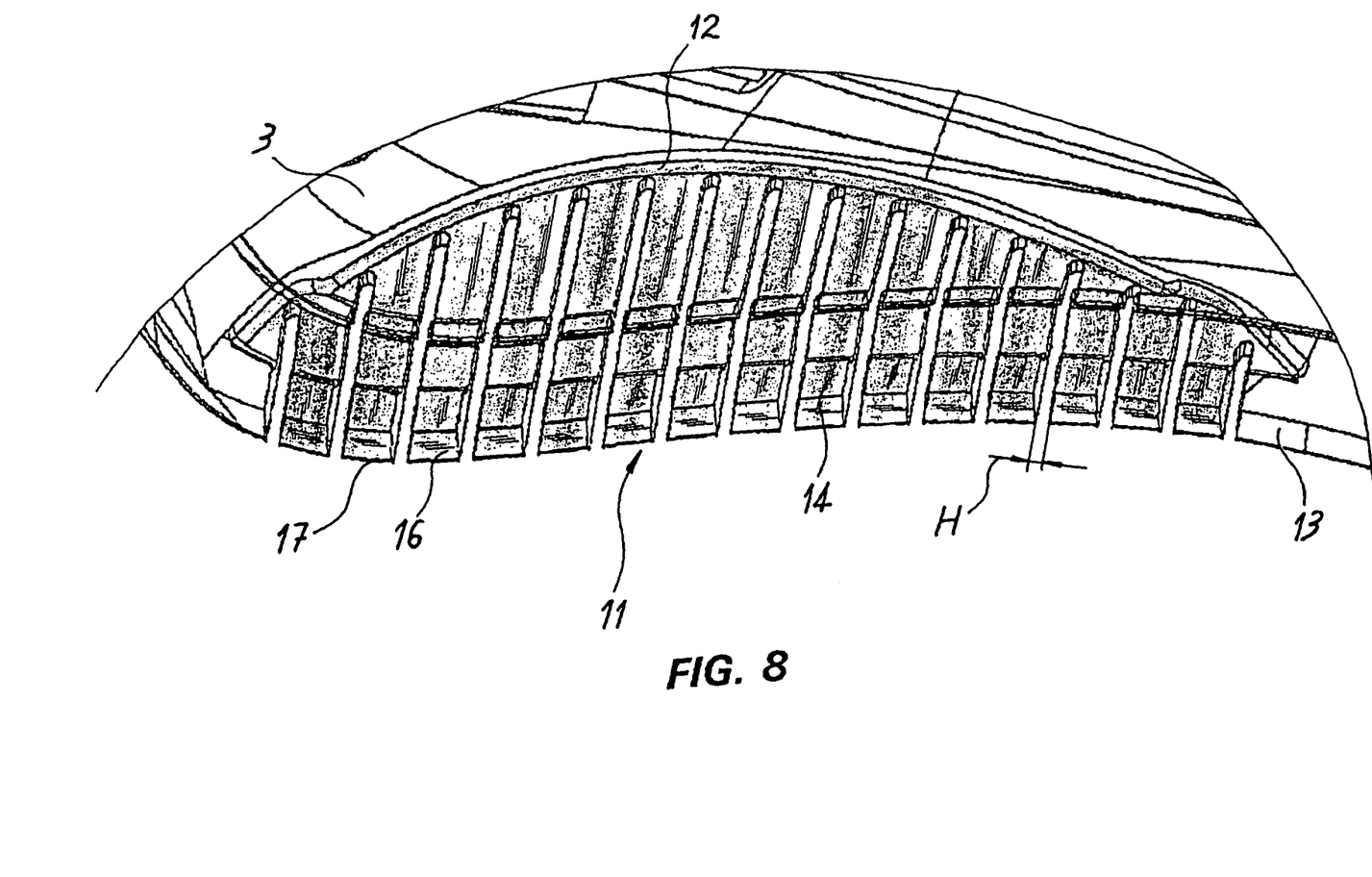
FIG. 8 is a perspective enlarged view of a detail of the structure shown in FIG. 1.

The spaces between the projections 14 are advantageously filled with filling elements 15, made of a plastic and/or elastomeric material, and adapted to preserve the flexibility of the projections 14 and to increase their comfort and durability. The filling elements 15 may also partly cover the projections 14, as shown in FIG. 2 and in FIG. 5.

The free ends 16 of the projections 14 are substantially aligned to define an edge 17 which is connected with the outer peripheral edge 13 of the frame 3.

Each projection 14 may have such a cross section and shape as to provide a predetermined flexural and shear strength, when acted upon by a force directed both substantially normal to the seat surface 2, and along a plane substantially parallel to the seat surface 2.

Hence, each differential rigidity portion 11, 11' contributes to support the weight acting on the seat surface 2, whose extension is not noticeably reduced due to the provision of the portions 11, 11'. Therefore, if the user's weight is distributed over a wide seat surface 2, contact pressures are still low, which is advantageous for the overall comfort of the support structure 1. Also, the flexibility of the projecting appendices 14 assists the user in his/her motion, particularly during pedaling motion.

Suitably, at least one pair of differential rigidity portions 11 is positioned symmetrically with respect to the longitudinal axis L, at the sides of the widened rear portion 9 and/or at the junction between the widened rear portion 9 and the elongated front portion 10.

This selection of the differential rigidity portions 11 is addressed by the fact that these portions continuously and cyclically contact the inside thighs of the user during the pedaling motion.

Advantageously, frame 3 may include at least one differential rigidity portion 11', located on the rear edge 18 of the widened rear portion 9.

The differential rigidity portion 11' provides a higher flexibility rear portion, which is advantageous when the user stands on the pedals of the bicycle or a similar product. Particularly, in order to run through steep descents or avoid obstacles, mountain-bike users would rather take a backwardly unbalanced, standing position on the pedals, or have their body only supported at the rear edge 18 of the widened rear portion 9. In such as position, any desired contact or accidental shock against the rear edge 18 is less traumatic and dangerous thanks to the differential rigidity portion 11'.

Further, the differential rigidity portion 11' on the rear edge 18 does not cause any weakening of the frame 3 and allows to shape the rear edge 18 as desired, and to confer it a pleasant aspect.

For a higher comfort of the support structure 1, the yieldable pad 7 may have such a size as to extend wholly or partly above the differential rigidity portions 11, 11'. Also, for aesthetic and protection purposes, the covering layer 8 may also have such an extension as to wholly or partly cover the differential rigidity portions 11, 11'.

The above description clearly shows that the support structure of the invention allows to achieve the proposed objects and that particularly the presence of differential rigidity portions at the sides of the widened rear portion and/or at the junction between the widened rear portion and the elongated front portion provides the double advantage of making easier the pedaling motion, by improving the contact between the support structure and the inside thighs of the user, and of maintaining a wide seat surface, without weakening the frame and increasing the pressures exerted on the user.

The support structure according to the invention is susceptible of a numerous modifications and changes all falling, within the inventive concept disclosed in the appended claims. All the details thereof may be replaced by other technically equivalents, and the materials may vary depending on different needs, without departing from the scope of the invention.

While the support structure has been described with particular reference to the accompanying figures, the numerals referred to in the disclosure and claims are only used for the sake of a better intelligibility of the invention and shall not be intended to limit the claimed scope in any manner.

The instant application is based upon and claims priority of patent application no. VI2002A000208, filed on Jan. 10, 2002 in Italy, the disclosure of which is hereby expressly incorporated here in reference thereto.

The invention claimed is:

1. A support structure having a seat surface, particularly for bicycles and other pedal operated machines, comprising a substantially rigid or semirigid frame, means for securing said frame to the bicycle or a pedal operated machine, a yieldable pad secured to the top face of said frame, a covering layer superimposed to the yieldable pad, said frame has one or more portions having a rigidity that is different from the rigidity of the remaining frame portions and that is adapted to impart local flexibility, said differential rigidity portions being located in the proximity of an outer peripheral edge of said frame, wherein said frame has at least one recess along its outer peripheral edge, each of said differential rigidity portions comprising a plurality of elongated projections extending outwards from their respective recesses formed in said frame, wherein said projections have free ends.

2. Support structure as claimed in claim 1, wherein said projections of each of said differential rigidity portions extend substantially parallel to one another so as to form a comblike structure.

3. Support structure as claimed in claim 2, wherein each of said projections of each of said differential rigidity portions is located at a predetermined distance (H) from the other projections adjacent thereto, which distance may vary for each projection.

4. Support structure as claimed in claim 3, wherein each of said differential rigidity portions comprises filling elements within the spaces between said projections.

5. Support structure as claimed in claim 4, wherein the base material of said filling elements is a plastic and/or elastomeric material.

6. Support structure as claimed in claim 5, wherein the free ends of said projections are substantially aligned to define an edge which is connected with said outer peripheral edge of said frame.

7. Support structure as claimed in claim 1, wherein each of said projections has a cross section and shape as to provide a predetermined flexural and shear strength relative to load activity in a defined direction.

8. Support structure as claimed in claim 7, wherein each of said projections has such a cross section and shape as to provide a predetermined flexural and shear strength, relative to load activity both substantially normal to said seat surface, and along a plane substantially parallel to the seat surface.

9. Support structure as claimed in claim 1, wherein said projections are monolithic with said frame.

10. Support structure as claimed in claim 1, wherein said frame has a laterally widened rear portion for supporting the buttocks of a user and an elongated front portion defining a longitudinal axis (L).

11. Support structure as claimed in claim 1, wherein it comprises at least one pair of said differential rigidity portions, symmetrically located with respect to said longitudinal axis (L).

12. Support structure as claimed in claim 11, wherein said symmetric pair of differential rigidity portions is located at the sides of said widened rear portion and/or at the junction between said widened rear portion and said elongated front portion.

13. Support structure as claimed in claim 12, wherein at least one of said differential rigidity portions is located on the rear edge of said widened rear portion.

14. Support structure as claimed in claim 1, wherein said yieldable pad and/or said covering layer have such an extension as to wholly or partly cover said differential rigidity portions.

15. A support structure comprising a substantially rigid or semirigid frame having one or more portions with a rigidity that is different from the rigidity of the remaining frame portions and that are adapted to impart local flexibility, wherein said frame includes at least one recess along its outer peripheral edge, and wherein said differential rigidity portions comprise a plurality of elongated projections extending outwards from their respective recesses formed in said frame and having free ends.

16. Support structure as claimed in claim 15, wherein said projections of each of said differential rigidity portions extend substantially parallel to one another so as to form a comblike structure.

17. Support structure as claimed in claim 15, wherein each of said differential rigidity portions comprises filling elements within the spaces between said projections.

18. Support structure as claimed in claim 17, wherein the base material of said filling elements is a plastic and/or elastomeric material.

19. Support structure as claimed in claim 15, wherein the free ends of said projections are substantially aligned to define an edge which is connected with said outer peripheral edge of said frame.

* * * * *

UNITED STATES PATENT AND TRADEMARK OFFICE
CERTIFICATE OF CORRECTION

| | | |
|---|---|---|
| PATENT NO. | : 7,367,619 B2 | Page 1 of 1 |
| APPLICATION NO. | : 10/529177 | |
| DATED | : May 6, 2008 | |
| INVENTOR(S) | : Massimo Fregonese et al. | |

It is certified that error appears in the above-identified patent and that said Letters Patent is hereby corrected as shown below:

Column 2:

Line 47: "achieved by a support structure according to claim 1. Thanks to" should read --achieved, according to claim 1, by a support structure having a seat surface, particularly for bicycles and other pedal operated machines, comprising a substantially rigid or semirigid frame, means for connecting the frame to the bicycle or a pedal operated machine, a yieldable pad secured to the top face of the frame, covering layer superimposed to said yieldable pad, characterized in that the frame has one or more portions of different rigidity adapted to facilitate the pedaling motion.
      Thanks to--

Signed and Sealed this

Second Day of September, 2008

JON W. DUDAS
*Director of the United States Patent and Trademark Office*